US012005746B2

(12) United States Patent
Nagase

(10) Patent No.: US 12,005,746 B2
(45) Date of Patent: Jun. 11, 2024

(54) TIRE, TIRE MOLD, AND TIRE PRODUCTION METHOD

(71) Applicant: Sumitomo Rubber Industries, Ltd., Kobe (JP)

(72) Inventor: Masahiro Nagase, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 266 days.

(21) Appl. No.: 17/528,193

(22) Filed: Nov. 17, 2021

(65) Prior Publication Data

US 2022/0161609 A1 May 26, 2022

(30) Foreign Application Priority Data

Nov. 20, 2020 (JP) .................................. 2020-193365

(51) Int. Cl.
| | |
|---|---|
| *B60C 11/00* | (2006.01) |
| *B29D 30/06* | (2006.01) |
| *B60C 11/03* | (2006.01) |
| *B60C 15/00* | (2006.01) |
| *B60C 15/06* | (2006.01) |
| *B60C 13/00* | (2006.01) |

(52) U.S. Cl.
CPC ...... *B60C 15/0603* (2013.01); *B29D 30/0606* (2013.01); *B60C 11/0332* (2013.01); *B60C 15/0036* (2013.01); *B60C 2013/007* (2013.01); *B60C 2015/061* (2013.01)

(58) Field of Classification Search
CPC . B60C 15/06; B60C 15/0603; B60C 15/0607; B60C 15/0036; B60C 15/0009; B60C 2015/061; B60C 11/0332
See application file for complete search history.

(56) References Cited

U.S. PATENT DOCUMENTS

| | | | |
|---|---|---|---|
| 6,213,182 B1 * | 4/2001 | Hanya ...................... | B60C 3/04 152/454 |
| 2005/0103419 A1 * | 5/2005 | Yamamoto ............. | B60C 13/00 152/557 |

(Continued)

FOREIGN PATENT DOCUMENTS

| | | | |
|---|---|---|---|
| JP | 2018-2008 A | | 1/2018 |
| JP | 2018090036 A | * | 6/2018 |

(Continued)

OTHER PUBLICATIONS

Machine Translation: JP-2020019400-A, Hoshino R, (Year: 2024).*
Machine Translation: JP-2018090036-A, Sakamoto H, (Year: 2024).*
Machine Translation: JP-2018154159-A, Hayama K, (Year: 2024).*

*Primary Examiner* — Kendra Ly
(74) *Attorney, Agent, or Firm* — XSENSUS LLP

(57) ABSTRACT

A tire includes a tread, a pair of sidewalls, a pair of beads, and a carcass. Each bead includes a core and an apex. In the tire in the normal state, a ratio (HA/HS) of a distance HA in a radial direction from a bead base line to an outer end PA of the apex to a tire cross-sectional height HS may not be less than 20% and/or may not be greater than 30%, and an angle of a line segment connecting between the outer end PA of the apex and a center PM of a width, in an axial direction, of a contact surface of the apex at which the apex is in contact with the core, relative to the bead base line, may not be less than 45° and/or may not be greater than 55°.

4 Claims, 6 Drawing Sheets

(56) References Cited

U.S. PATENT DOCUMENTS

| | | | |
|---|---|---|---|
| 2012/0325389 A1* | 12/2012 | Matsuura | B60C 15/0603 |
| | | | 152/539 |
| 2015/0027609 A1* | 1/2015 | Uchida | B60C 15/024 |
| | | | 152/539 |
| 2017/0057301 A1* | 3/2017 | Hashimoto | B60C 17/0009 |
| 2019/0135051 A1* | 5/2019 | Tomita | B29D 30/0606 |

FOREIGN PATENT DOCUMENTS

| | | | |
|---|---|---|---|
| JP | 2018154159 A | * | 10/2018 |
| JP | 2020019400 A | * | 2/2020 |

* cited by examiner

TIRE, TIRE MOLD, AND TIRE PRODUCTION METHOD

CROSS-REFERENCE TO RELATED APPLICATION

The present application claims priority to Japanese patent application JP 2020-193365, filed on Nov. 20, 2020, the entire contents of which are incorporated herein by reference in its entirety.

BACKGROUND

Technical Field

The present disclosure relates to a tire, a tire mold, and a tire production method.

Description of the Background Art

A tire is typically required to have reduced rolling resistance in consideration of the environments (for example, see Japanese Laid-Open Patent Publication No. 2018-2008).

In order to reduce rolling resistance, for example, application of rubber having low-heat-generation properties compared to a cap layer of a tread has been examined. In a case where rubber having low-heat-generation properties is applied to the cap layer, grip force may be reduced and braking performance of the tire may deteriorate. Therefore, a composition of the cap layer may be improved by placing a focus on a loss tangent at 30° C. and a structure of the tire may be simplified in order to allow braking performance to be ensured and allow rolling resistance to be reduced.

SUMMARY

According to an aspect, a tire having a speed range from W to Y in a speed rating chart, where W is 270 km/h and Y is 300 km/h, is disclosed or provided. The tire can comprise: a tread configured to come into contact with a road surface; a pair of sidewalls continuous with ends of the tread, the pair of sidewalls disposed inwardly of the tread in a radial direction; a pair of beads disposed inwardly of the sidewalls in the radial direction; and a carcass extending on and between one of the beads and another of the beads in portions inward of the tread and the pair of sidewalls, wherein the beads include cores and apexes disposed outwardly of the cores in the radial direction, and wherein, in a normal state in which the tire is mounted on a normal rim, an internal pressure is adjusted to a normal internal pressure, and no load is applied: a ratio of a distance in the radial direction from a bead base line to an outer end of each said apex, to a tire cross-sectional height, is not less than 20% and not greater than 30%, and an angle of a line segment connecting between the outer end of each said apex and a center of a width, in an axial direction, of a contact surface of the apex at which the apex is in contact with a corresponding one of the cores, relative to the bead base line, is not less than 45° and not greater than 55°.

According to another aspect, a tire mold for forming a tire is disclosed, provided, or implemented. The tire mold can comprise: a cavity surface configured to shape an outer surface of the tire on an outer surface of a green tire for the tire, wherein the cavity surface includes a reference surface defining a clip width of the mold, wherein, on a contour of the cavity surface, the reference surface is represented by a straight line extending in the radial direction, and a portion between a maximum width position of the cavity surface and the reference surface is represented by three contour lines formed of arcs, wherein the three contour lines are an outer contour line continuous with the maximum width position, an inner contour line continuous with the reference surface, and an intermediate contour line between the outer contour line and the inner contour line, wherein a center of a circle that includes an arc representing the outer contour line is disposed inwardly of the cavity surface on a straight line extending through the maximum width position in the axial direction, wherein a center of a circle that includes an arc representing the inner contour line is disposed outwardly of the cavity surface on a straight line extending through an outer end of the reference surface in the axial direction, wherein a center of a circle that includes an arc representing the intermediate contour line is disposed inwardly of the cavity surface, wherein the intermediate contour line is in contact with each of the outer contour line and the inner contour line, wherein the arc representing the outer contour line is in contact with an inclined line extending through the outer end of the reference surface so as to be inclined relative to the axial direction, and wherein an angle of the inclined line relative to the axial direction is not less than 50° and not greater than 60°. The tire can have a speed range from W to Y in a speed rating chart, where W is 270 km/h and Y is 300 km/h, and the tire can comprise: a tread configured to come into contact with a road surface; a pair of sidewalls continuous with ends of the tread, the pair of sidewalls disposed inwardly of the tread in a radial direction; a pair of beads disposed inwardly of the sidewalls in the radial direction; and a carcass extending on and between one of the beads and another of the beads in portions inward of the tread and the pair of sidewalls, wherein the beads include cores and apexes disposed outwardly of the cores in the radial direction, and wherein, in a normal state in which the tire is mounted on a normal rim, an internal pressure is adjusted to a normal internal pressure, and no load is applied: a ratio of a distance in the radial direction from a bead base line to an outer end of each said apex, to a tire cross-sectional height, is not less than 20% and not greater than 30%, and an angle of a line segment connecting between the outer end of each said apex and a center of a width, in an axial direction, of a contact surface of the apex at which the apex is in contact with a corresponding one of the cores, relative to the bead base line, is not less than 45° and not greater than 55°.

According to yet another aspect, a method for producing a tire is disclosed or implemented. The method can comprise: pressurizing and heating a green tire for the tire in a mold, wherein the mold includes a cavity surface for shaping an outer surface of the tire on an outer surface of the green tire, wherein the cavity surface includes a reference surface defining a clip width of the mold, wherein, on a contour of the cavity surface, the reference surface is represented by a straight line extending in the radial direction, and a portion between a maximum width position of the cavity surface and the reference surface is represented by three contour lines formed of arcs, wherein the three contour lines are an outer contour line continuous with the maximum width position, an inner contour line continuous with the reference surface, and an intermediate contour line between the outer contour line and the inner contour line, wherein a center of a circle that includes an arc representing the outer contour line is disposed inwardly of the cavity surface on a straight line extending through the maximum width position in the axial direction, wherein a center of a circle that includes an arc representing the inner contour line is disposed outwardly of the cavity surface on a straight line extending through an outer end of the reference surface in the axial direction, wherein a center of a circle that includes an arc representing the intermediate contour line is disposed inwardly of the cavity surface, wherein the intermediate contour line is in contact with each of the outer contour line and the inner contour line, wherein the arc representing the outer contour line is in contact with an inclined line extending through the outer end of the reference surface so as to be inclined relative to the axial direction, and wherein an angle of the inclined line relative to the axial direction is not less than 50° and not greater than 60°. The tire can have a speed range from W to Y in a speed rating chart, where W is 270 km/h and Y is 300 km/h, and the tire can comprise: a tread configured to come into contact with a road surface; a pair of sidewalls continuous with ends of the tread, the pair of sidewalls disposed inwardly of the tread in a radial direction; a pair of beads disposed inwardly of the sidewalls in the radial direction; and a carcass extending on and between one of the beads and another of the beads in portions inward of the tread and the pair of sidewalls, wherein the beads include cores and apexes disposed outwardly of the cores in the radial direction, and wherein, in a normal state in which the tire is mounted on a normal rim, an internal pressure is adjusted to a normal internal pressure, and no load is applied: a ratio of a distance in the radial direction from a bead base line to an outer end of each said apex, to a tire cross-sectional height, is not less than 20% and not greater than 30%, and an angle of a line segment connecting between the outer end of each said apex and a center of a width, in an axial direction, of a contact surface of the apex at which the apex is in contact with a corresponding one of the cores, relative to the bead base line, is not less than 45° and not greater than 55°.

DETAILED DESCRIPTION

Figure 1:
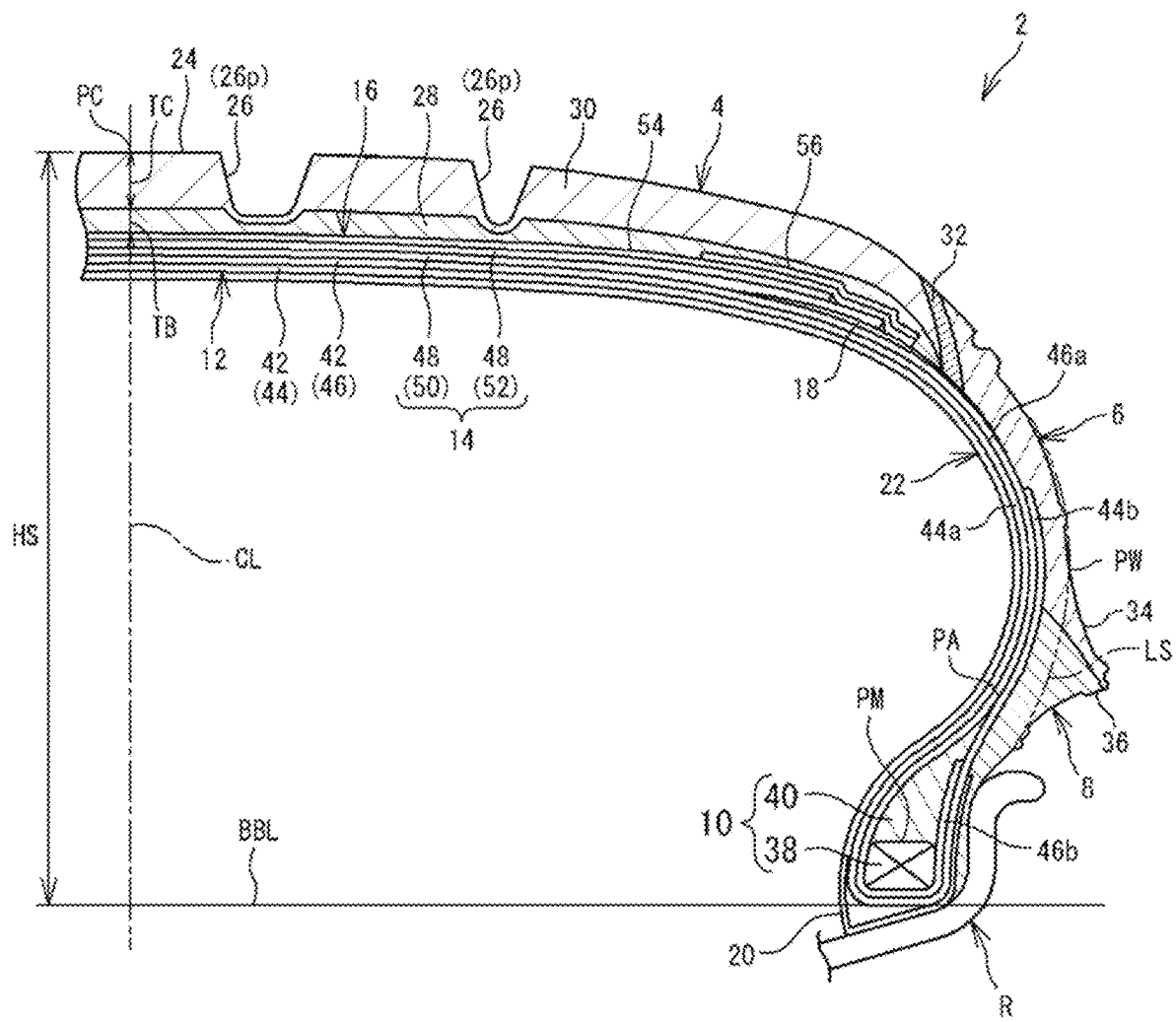
FIG. 1 is a cross-sectional view of a part of a tire according to one or more embodiments of the present disclosure.

The present disclosure will be described below in detail with appropriate reference to the drawings.

In the present disclosure, a state where a tire is mounted on a normal rim, an internal pressure of the tire is adjusted to a normal internal pressure, and no load is applied to the tire can be referred to as a normal state. In the present disclosure, unless otherwise specified, dimensions and angles of tire components are measured in the tire in the normal state.

The normal rim can represent a rim defined by a standard on which the tire is based. The "standard rim" included in applicable rims in the JATMA standard, the "Design Rim" in the TRA standard, and the "Measuring Rim" in the ETRTO standard can be considered or characterized as normal rims.

The normal internal pressure can represent an internal pressure defined by a standard on which the tire is based. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard can be considered or characterized as normal internal pressures. In the case of a tire for a passenger car, the normal internal pressure may be 180 kPa unless otherwise specified.

The normal load can represent a load defined by a standard on which the tire is based. The "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard can be considered or characterized as normal loads. In the case of a tire for a passenger car, the normal load may be a load corresponding to 88% of the above-described load unless otherwise specified.

In the present disclosure, a load index (LI) can refer to an index representing, for example, a maximum mass that is defined by the JATMA standard and can be allowed to be applied to a tire under a specified condition, that is, can represent a maximum load capacity as an index number.

In the present disclosure, a loss tangent (also referred to as tan δ), at a temperature of 30° C., of a component formed of crosslinked rubber, among components of the tire, can be measured by using a viscoelasticity spectrometer ("VES" manufactured by Iwamoto Seisakusho), for instance, under the following conditions in accordance with the standard of JIS K6394.

Initial strain=10%
Dynamic strain=2%
Frequency=10 Hz
Deformation mode=tension

In this measurement, a test piece can be sampled from the tire. In a case where a test piece cannot be sampled from the tire, a test piece can be sampled from sheet-shaped crosslinked rubber (hereinafter, also referred to as rubber sheet) obtained by pressurizing and heating a rubber composition used for forming a component to be measured, for instance, at a temperature of 170° C., for 12 minutes.

In the present disclosure, a hardness of a component formed of crosslinked rubber, among the components of the tire, can be measured by using a type A durometer in accordance with the standard of JIS K6253, for instance, under a condition that the temperature is 23° C.

Reduction of rolling resistance at a higher level may be required, and the requirement may not be able to be met merely by simplifying the structure.

Accordingly, embodiments of the present disclosure have been made in view of such circumstances, and an object of the present disclosure, among other objects, is to provide a tire that can allow enhancement of braking performance and reduction of rolling resistance while ensuring necessary steering stability, a tire mold for obtaining the tire, and a tire production method.

The inventor of the present disclosure has examined the structure with placing a focus on deflection of a tire, so that the inventor has found that, by controlling deflection, braking performance can be enhanced and rolling resistance can be reduced while necessary steering stability can be ensured.

A tire according to one or more aspects of the present disclosure can include a speed range of not less than W. The tire can include: a tread configured to come into contact with a road surface; a pair of sidewalls continuous with ends of the tread, the pair of sidewalls disposed inwardly of the tread in a radial direction; a pair of beads disposed inwardly of the sidewalls in the radial direction; and a carcass extending on and between one of the beads and another of the beads in portions inward of the tread and the pair of sidewalls. The beads can include cores and apexes disposed outwardly of the cores in the radial direction. In a normal state in which the tire is mounted on a normal rim, an internal pressure of the tire can be adjusted to a normal internal pressure, and no load can be applied to the tire, a ratio of a distance in the radial direction from a bead base line to an outer end of each apex, to a tire cross-sectional height, may not be less than 20% and not greater than 30%, and an angle of a line segment connecting between the outer end of each apex and a center of a width, in an axial direction, of a contact surface of the apex at which the apex is in contact with a corresponding one of the cores, relative to the bead base line, may be not less than 45° and may not be greater than 55°.

A tire mold according to one or more aspects of the present disclosure can be directed to a mold for forming the above-described tire. The mold can include a cavity surface configured to shape an outer surface of the tire on an outer surface of a green tire for the tire. The cavity surface can include a reference surface defining a clip width of the mold. On a contour of the cavity surface, the reference surface can be represented by a straight line extending in the radial direction, and a portion between a maximum width position of the cavity surface and the reference surface can be represented by three contour lines formed of arcs. The three contour lines can be an outer contour line continuous with the maximum width position, an inner contour line continuous with the reference surface, and an intermediate contour line between the outer contour line and the inner contour line. A center of a circle that includes an arc representing the outer contour line can be disposed inwardly of the cavity surface on a straight line extending through the maximum width position in the axial direction. A center of a circle that includes an arc representing the inner contour line can be disposed outwardly of the cavity surface on a straight line extending through an outer end of the reference surface in the axial direction. A center of a circle that includes an arc representing the intermediate contour line can be disposed inwardly of the cavity surface. The intermediate contour line can be in contact with each of the outer contour line and the inner contour line. The arc representing the outer contour line can be in contact with an inclined line extending through the outer end of the reference surface so as to be inclined relative to the axial direction. An angle of the inclined line relative to the axial direction may not be not less than 50° and may not be greater than 60°.

A tire production method according to one or more aspects of the present disclosure can be directed to a method for producing the above-described tire. The tire production method can include pressurizing and heating a green tire for the tire in a mold. The mold can include a cavity surface for shaping an outer surface of the tire on an outer surface of the green tire. The cavity surface can include a reference surface defining a clip width of the mold. On a contour of the cavity surface, the reference surface can be represented by a straight line extending in the radial direction, and a portion between a maximum width position of the cavity surface and the reference surface can be represented by three contour lines formed of arcs. The three contour lines can be an outer contour line continuous with the maximum width position, an inner contour line continuous with the reference surface, and an intermediate contour line between the outer contour line and the inner contour line. A center of a circle that includes an arc representing the outer contour line can be disposed inwardly of the cavity surface on a straight line extending through the maximum width position in the axial direction. A center of a circle that includes an arc representing the inner contour line can be disposed outwardly of the cavity surface on a straight line extending through an outer end of the reference surface in the axial direction. A center of a circle that includes an arc representing the intermediate contour line can be disposed inwardly of the cavity surface. The intermediate contour line can be in contact with each of the outer contour line and the inner contour line. The arc representing the outer contour line can be in contact with an inclined line extending through the outer end of the reference surface so as to be inclined relative to the axial direction. An angle of the inclined line relative to the axial direction may not be less than 50° and may not be greater than 60°.

FIG. 1 illustrates a part of a tire 2 according to one or more embodiments of the present disclosure. The tire 2 can be a tire for a passenger car. In FIG. 1, the tire 2 is mounted on a rim R. The rim R can be a normal rim. The inside of the tire 2 can be filled with air to adjust the internal pressure of the tire 2. The tire 2 shown in FIG. 1 can be set in the normal state.

The tire 2 mounted on the rim R may also be referred to as a tire-rim complex. The tire-rim complex can include the rim R and the tire 2 mounted on the rim R.

FIG. 1 shows a part of a cross-section of the tire 2 along a plane including a rotation axis of the tire 2. In FIG. 1, the left-right direction represents an axial direction of the tire 2, and the up-down direction represents a radial direction of the tire 2. The direction perpendicular to the surface of the drawing sheet in FIG. 1 represents a circumferential direction of the tire 2. In FIG. 1, an alternate long and short dash line CL represents an equator plane of the tire 2.

In FIG. 1, a solid line BBL extending in the axial direction represents a bead base line. The bead base line can represent a line that defines a rim diameter (see JATMA and the like) of the rim R.

The tire 2 can include a tread 4, a pair of sidewalls 6, a pair of clinches 8, a pair of beads 10, a carcass 12, a belt 14, a band 16, a pair of cushion layers 18, a pair of chafers 20, and an inner liner 22.

The tread 4 can come into contact with a road surface at the outer surface, that is, at a tread surface 24. The tread 4 can be disposed outwardly of the band 16 in the radial direction. The tread 4 of the tire 2 can have grooves 26. The groove 26 shown in FIG. 1 can represent a circumferential groove 26p, for instance, continuously extending in the circumferential direction. In the tire 2, a groove depth of the circumferential groove 26p may not be greater than 8 mm.

In FIG. 1, reference character PC can represent the equator of the tire 2. The equator PC can be represented as an intersection point of the tread surface 24 and the equator plane CL. In FIG. 1, a length represented by a double-headed arrow HS can represent a tire cross-sectional height (see JATMA and the like). The tire cross-sectional height HS can be represented by a distance in the radial direction from the bead base line BBL to the equator PC.

The tread 4 can have a base layer 28 and a cap layer 30. The base layer 28 can cover the entirety of the band 16, for instance. The base layer 28 can be formed of crosslinked rubber having low-heat-generation properties. In the tire 2, a loss tangent of the base layer 28 at 30° C. may not be greater than 0.10.

The cap layer 30 can be disposed outwardly of the base layer 28 in the radial direction. The cap layer 30 can cover the entirety of the base layer 28, for instance. The outer surface of the cap layer 30 can be the tread surface 24 described above. The cap layer 30 can be formed of crosslinked rubber produced in consideration of wear resistance and grip performance. In the tire 2, the loss tangent of the cap layer 30 at 30° C. may not be less than 0.20 and may not be greater than 0.25.

In FIG. 1, a double-headed arrow TB can represent a thickness of the base layer 28. A double-headed arrow TC can represent a thickness of the cap layer 30. In the tire 2, the thickness TB of the base layer 28 and the thickness TC of the cap layer 30 can be measured along the equator plane CL on the cross-section of the tire 2 obtained by cutting the tire 2 along the plane including the rotation axis.

In the tire 2, from the viewpoint of grip performance, the tread 4 can be structured such that the thickness TC of the cap layer 30 can be greater than the thickness TB of the base layer 28. For instance, a ratio (TC/TB) of the thickness TC of the cap layer 30 to the thickness TB of the base layer 28 can be not less than 70/30, for instance, not greater than 90/10.

The tread 4 can include wings 32 disposed between the sidewalls 6 and a tread body formed of the base layer 28 and the cap layer 30, in addition to the base layer 28 and the cap layer 30. The tread body and the sidewalls 6 can be joined by the wings 32. The wing 32 can be formed of crosslinked rubber produced in consideration of adhesiveness.

The sidewalls 6 can be continuous with the ends, respectively, of the tread 4. The sidewall 6 can be disposed inwardly of the tread 4 in the radial direction. The sidewall 6 can extend from the end of the tread 4 toward the clinch 8 along the carcass 12. The sidewall 6 can be formed of crosslinked rubber produced in consideration of cut resistance, for instance. Side surfaces 34 forming a part of the outer surface of the tire 2 can be formed by the outer surfaces of the sidewalls 6 and the outer surfaces of the clinches 8 described below. The side surfaces 34 can be continuous with the tread surface 24.

Each clinch 8 can be disposed inwardly of the sidewall 6 in the radial direction. The clinch 8 can come into contact with the rim R. The clinch 8 can be formed of crosslinked rubber produced in consideration of wear resistance, for instance.

In the tire 2, a rim protector 36 can be formed at a boundary portion between the sidewall 6 and the clinch 8. In FIG. 1, an alternate long and two short dashes line LS can represent an imaginary outer surface of the tire 2, for instance, obtained on the assumption that unevenness formed by the rim protector 36, a pattern, characters, and the like is absent. The rim protector 36 can protrude outwardly from the imaginary outer surface LS. The rim protector 36 can extend in the circumferential direction. The rim protector 36 can prevent damage to the sidewall 6 and the rim R when a vehicle having the tire 2 mounted thereto is made to move toward a road shoulder.

In FIG. 1, reference character PW can represent a tire maximum width position. As described above, in the tire 2, the rim protector 36 can be disposed so as to protrude from the imaginary outer surface LS. The tire maximum width position PW can be specified based on the contour of the imaginary outer surface LS. A distance in the axial direction from one of the tire maximum width positions PW to the other of the tire maximum width positions PW can be a tire cross-sectional width (see JATMA and the like).

Each bead 10 can be disposed inwardly of the clinch 8 in the axial direction. The bead 10 can be disposed inwardly of the sidewall 6 in the radial direction. Each bead 10 can include a core 38 and an apex 40.

The core 38 can include a steel wire. The core 38 can be formed by winding the wire in the circumferential direction. A plurality of wire cross-sections can be included in the cross-section of the core 38. In the tire 2, the number of the wire cross-sections included in the cross-section of the core 38 can be not less than 20 and/or not greater than 25.

The apex 40 can be disposed outwardly of the core 38 in the radial direction. The apex 40 can be formed of crosslinked rubber having high stiffness. The hardness of the apex 40 may not be less than 85 and/or may not be greater than 95. The apex 40 can be tapered outwardly. In FIG. 1, reference character PA can represent the outer end of the apex 40.

The carcass 12 can be disposed inwardly of the tread 4, the pair of sidewalls 6, and the pair of clinches 8. The carcass 12 can extend on and between one of the beads 10 and the other of the beads 10.

The carcass 12 can include at least one carcass ply 42. In the tire 2, the carcass 12 can have two carcass plies 42, for instance. The carcass ply 42 disposed inwardly of the tread 4 on the inner side in the radial direction can be referred to or characterized as a first carcass ply 44, and the carcass ply 42 disposed outwardly of the first carcass ply 44 can be referred to or characterized as a second carcass ply 46. The carcass 12 can include the first carcass ply 44 and the second carcass ply 46.

The first carcass ply 44 can include a first ply body 44a, which can extend on and between one of the cores 38 and the other of the cores 38, and a pair of first turned-up portions 44b, which can be continuous with the first ply body 44a and turned up around the respective cores 38 from the inner side toward the outer side in the axial direction. In the tire 2, the end of the first turned-up portion 44b can be disposed outwardly of the tire maximum width position PW in the radial direction. The end of the first turned-up portion 44b can be disposed inwardly of the end of the belt 14 in the radial direction.

The second carcass ply 46 can include a second ply body 46a, which can extend on and between one of the cores 38 and the other of the cores 38, and a pair of second turned-up portions 46b, which can be continuous with the second ply body 46a and turned up around the respective cores 38 from the inner side toward the outer side in the axial direction. In the tire 2, the end of the second turned-up portion 46b can be disposed between the outer end PA of the apex 40 and a contact surface of the apex 40 at which the apex 40 is in contact with the core 38, in the radial direction. The end of the second turned-up portion 46b can be disposed between the apex 40 and the first turned-up portion 44b in the axial direction.

The carcass ply 42 can include multiple carcass cords aligned with each other. The carcass cords can be covered with topping rubber. The carcass cords can be formed of an organic fiber. Examples of the organic fiber can include nylon fibers, rayon fibers, polyester fibers, and aramid fibers.

The carcass cords can intersect the equator plane. In the tire 2, the carcass 12 can have a radial structure. Each of the carcass cords in the carcass 12 can extend on and between one end of the carcass ply 42 and the other end of the carcass ply 42.

The belt 14 can be disposed inwardly of the tread 4 in the radial direction. The belt 14 can be disposed between the carcass 12 and the band 16. The belt 14 can be stacked on the carcass 12. In the tire 2, the width of the belt 14 may not be less than 70% of the tire cross-sectional width and/or may not be greater than 85% thereof.

The belt 14 can include at least two layers 48 stacked in the radial direction. In the tire 2, the belt 14 can include two layers 48 stacked in the radial direction. Among the two layers 48, the layer 48 disposed on the inner side can be an inner layer 50, and the layer 48 disposed on the outer side can be an outer layer 52. As shown in FIG. 1, the inner layer 50 can have a width greater than a width of the outer layer 52. The end of the inner layer 50 can be disposed outwardly of the end of the outer layer 52 in the axial direction. A distance from the end of the outer layer 52 to the end of the inner layer 50 may not be less than 3 mm and/or may not be greater than 10 mm.

The inner layer 50 and the outer layer 52 can each include multiple belt cords aligned with each other. The belt cords can be covered with topping rubber. Each of the belt cords can be inclined relative to the equator plane. A material of the belt cords can be steel, for instance.

The band 16 can be disposed between the tread 4 and the belt 14 in the radial direction. The band 16 can be stacked on the belt 14. The end of the band 16 can be disposed outwardly of the end of the belt 14 in the axial direction. A distance from the end of the belt 14 to the end of the band 16 may not be less than 3 mm and/or may not be greater than 7 mm.

The band 16 can include a helically wound band cord, for instance. The band cord can extend substantially in the circumferential direction. Specifically, an angle of the band cord relative to the circumferential direction may not be greater than 5°. The band 16 can have a jointless structure. In the tire 2, a cord formed of an organic fiber can be used as the band cord. Examples of the organic fiber include nylon fibers, rayon fibers, polyester fibers, and aramid fibers.

In the tire 2, the band 16 can include a full band 54, which can have both ends opposing each other across the equator plane, and a pair of edge bands 56, which can be spaced from each other in the axial direction and that can hold the ends of the belt 14 and the ends of the full band 54. The band 16 may be formed as the full band 54. The band 16 may be formed as the pair of edge bands 56.

Each cushion layer 18 can be disposed between the belt 14 and the carcass 12 at the end of the belt 14. The cushion layer 18 can be formed of soft crosslinked rubber.

Each chafer 20 can be disposed inwardly of the bead 10 in the radial direction. The chafer 20 can come into contact with the rim R. In the tire 2, the chafer 20 can be formed of fabric and rubber impregnated in the fabric.

The inner liner 22 can be disposed inwardly of the carcass 12. The inner liner 22 can form the inner face of the tire 2. The inner liner 22 can be formed of crosslinked rubber having a low gas permeation coefficient. The inner liner 22 can retain the internal pressure of the tire 2.

Figure 2:
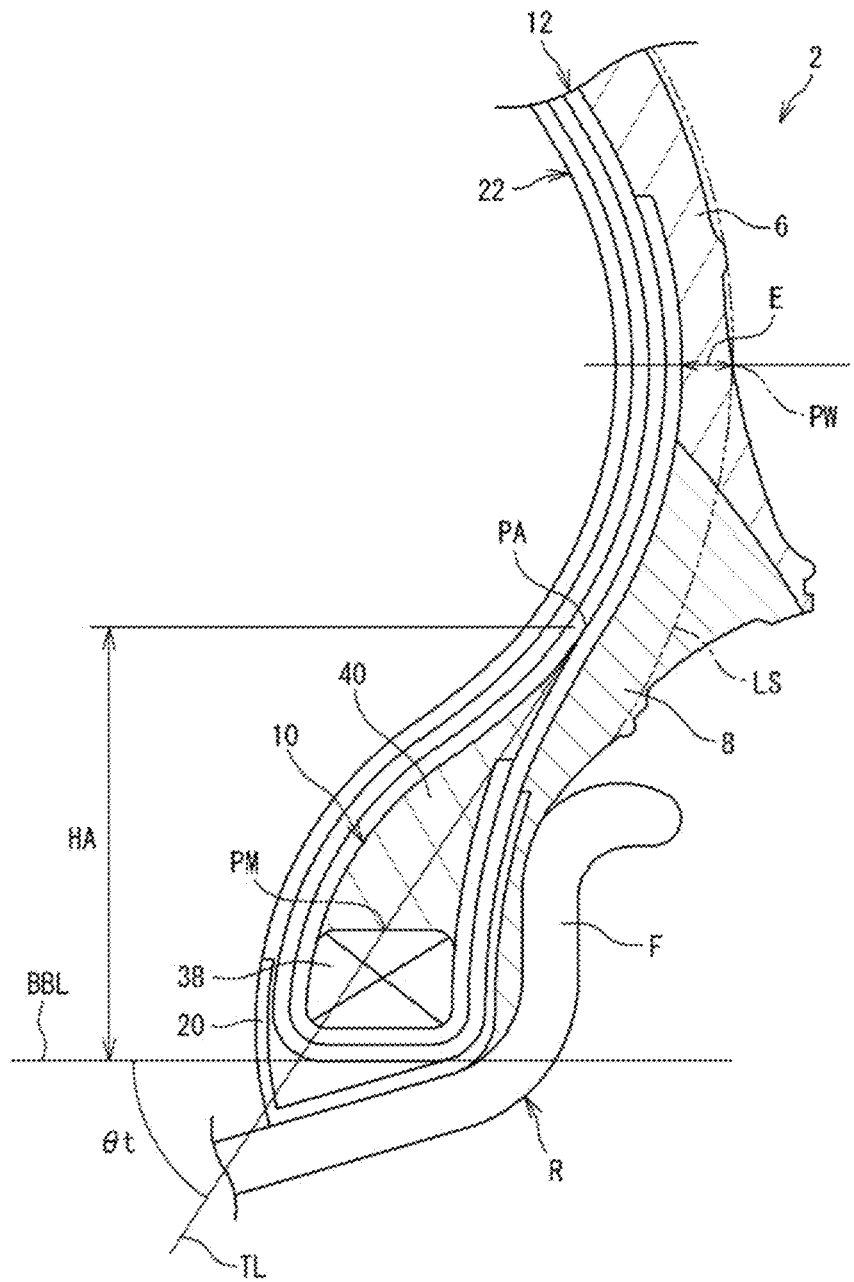
FIG. 2 is a cross-sectional view of a part of the tire shown in FIG. 1.

FIG. 2 shows a part of the tire 2 shown in FIG. 1, specifically, a bead 10. In FIG. 2, the left-right direction represents the axial direction of the tire 2 and the up-down direction represents the radial direction of the tire 2. The direction perpendicular to the surface of the drawing sheet in FIG. 2 represents the circumferential direction of the tire 2.

In FIG. 2, reference character PM can represent the center of the width, in the axial direction, of the contact surface of the apex 40 at which the apex 40 is in contact with the core 38. The center PM of the width of the contact surface in the axial direction may also be referred to as a width center. A solid line TL can represent a straight line passing through the width center PM and the outer end PA of the apex 40. An angle θt can represent an angle of the solid line TL relative to the bead base line BBL. In the tire 2, the angle θt can represent an angle of a line segment connecting between the outer end PA of the apex 40 and the center PM of the width, in the axial direction, of the contact surface of the apex 40 at which the apex 40 is in contact with the core 38, relative to the bead base line BBL. The angle θt may also be referred to as an apex angle. In FIG. 2, a double-headed arrow HA can represent a distance in the radial direction from the bead base line BBL to the outer end PA of the apex 40. The distance HA in the radial direction may also be referred to as an apex height.

In a case where the apex height HA is low, deflection of the tire 2 may be increased. The increase of deflection can contribute to increase of a ground-contact area, so that enhancement of braking performance can be expected. However, in a case where the apex height HA is low, lateral stiffness of the tire 2 may be reduced, so that steering stability may be reduced. However, the inventor of the present disclosure has found that, even if the apex height HA is set to be less than that of a conventional tire, when the apex angle θt is set to be less than that of the conventional tire, a tensile force distribution of the carcass cords included in the ply bodies 44a, 46a can be changed to enhance in-plane torsional stiffness, so that lateral stiffness can be ensured.

In the tire 2 in the normal state, a ratio (HA/HS) of the apex height HA to the tire cross-sectional height HS may not be less than 20% and/or may not be greater than 30%.

The ratio (HA/HS) may not be greater than 30%, and the deflection of the tire 2 can thus be ensured. In the tire 2, a ground contact area can be increased. Particularly, in a case where the tire 2 is under a heavy load as in the case of a vehicle being braked, a sufficient ground contact area can be obtained. The tire 2 can exhibit good braking performance. Increase of the ground contact area (specifically, increase of ground contact width) can cause load on the tread 4 to be dispersed. In the tire 2, strain at the end portion of the tread 4 in which contribution to rolling resistance is great, can be reduced. The tire 2 can have reduced rolling resistance. From the viewpoint of ensuring good braking performance and reducing rolling resistance, the ratio (HA/HS) can be not greater than 27%.

The ratio (HA/HS) may not be less than 20%, and deflection can thus be prevented from becoming excessively great. In the tire 2, stiffness for the bead 10 can be ensured. From this viewpoint, the ratio (HA/HS) can be not less than 23%.

In the tire 2, the ratio (HA/HS) can be set to be not greater than 30%, for instance, in order to ensure deflection required for enhancing braking performance. Therefore, lateral stiffness may be reduced and steering stability may thus be reduced as compared with a conventional tire in which the ratio (HA/HS) is greater than 30%. However, in the tire 2, as described above, the apex angle θt can be set to be less than that of a conventional tire. For instance, the apex angle θt may not be greater than 55°.

The apex angle θt may not be greater than 55°, and in-plane torsional stiffness of the tire 2 can thus be increased, for instance, to ensure necessary lateral stiffness. In the tire 2, good steering stability can be maintained. The small apex angle θt can contribute to the low apex height HA. The tire 2 can allow enhancement of braking performance and reduction of rolling resistance while ensuring necessary steering stability.

In the tire 2, the apex angle θt may not be less than 45°. Deflection can be prevented from becoming excessively great, and necessary stiffness can thus be ensured. In the tire 2, good steering stability can be maintained. From this viewpoint, the apex angle θt can be not less than 50°.

In the tire 2, in the normal state, a ratio (HA/HS) of the apex height HA to the tire cross-sectional height HS may not be less than 20% and/or may not be greater than 30%, and the apex angle θt may not be less than 45° and/or may not be greater than 55°. The tire 2 can allow increase of deflection while ensuring lateral stiffness. The tire 2 can allow enhancement of braking performance and reduction of rolling resistance while ensuring necessary steering stability.

In FIG. 2, a double-headed arrow E can represent a thickness of the sidewall 6 measured along a straight line extending through the tire maximum width position PW in the axial direction. In the tire 2, the thickness E can represent a thickness of the sidewall 6 at the tire maximum width position PW.

In the tire 2, the thickness E of the sidewall 6 at the tire maximum width position PW can be not greater than 4.0 mm, for instance. Thus, the sidewall 6 can contribute to increase of deflection of the tire 2. From this viewpoint, the thickness E can be not greater than 3.5 mm. From the viewpoint of ensuring necessary stiffness, the thickness E can be not less than 2.5 mm, for instance, not less than 3.0 mm.

As described above, the tire 2 can allow enhancement of braking performance and reduction of rolling resistance while ensuring necessary steering stability, by increasing deflection and a ground contact area of the tire 2 while ensuring lateral stiffness. In the tire 2, from the viewpoint of further enhancing braking performance and further reducing rolling resistance, a vertical deflection B100 and a ground contact area A100, and a vertical deflection B73 and a ground contact area A73 can satisfy the following Equation (1) in which B100 and A100 can represent a vertical deflection and a ground contact area, respectively, obtained when a load represented by a load index is applied as a vertical load to the tire 2 in the normal state, and B73 and A73 can represent a vertical deflection and a ground contact area, respectively, obtained when a load that is 73% of a load represented by a load index is applied as a vertical load to the tire 2 in the normal state.

$$1.03 \le (B100/B73)/(A100/A73) \le 1.06 \qquad \text{Equation (1)}$$

Figure 3:
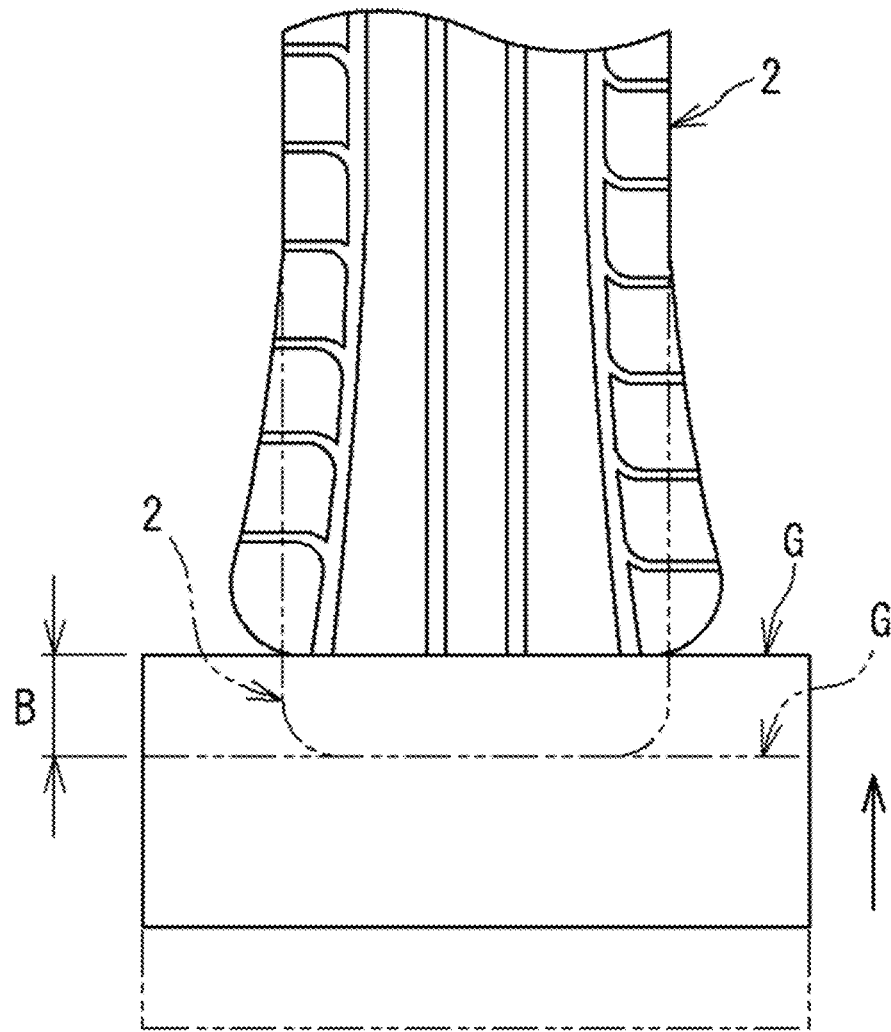
FIG. 3 is a schematic diagram illustrating vertical deflection of a tire according to one or more embodiments of the present disclosure.

For example, the vertical deflection B100 obtained when a load represented by a load index is applied as a vertical load to the tire 2 in the normal state can be calculated as follows. As shown in FIG. 3, after the tire 2 in the normal state is set with respect to a flat road surface G such that the rotation axis of the tire 2 is parallel to the flat road surface G, the road surface G can be moved upward. Displacement (length represented by a double-headed arrow B in FIG. 3) of the road surface G can be measured until a vertical load on the tire 2 reaches a load represented by a load index. The displacement B can be the vertical deflection B100 obtained when a load represented by a load index is applied as a vertical load to the tire 2. The vertical deflection B73 obtained when a load that is 73% of a load represented by a load index is applied as a vertical load to the tire 2 can be similarly measured.

Figure 4:
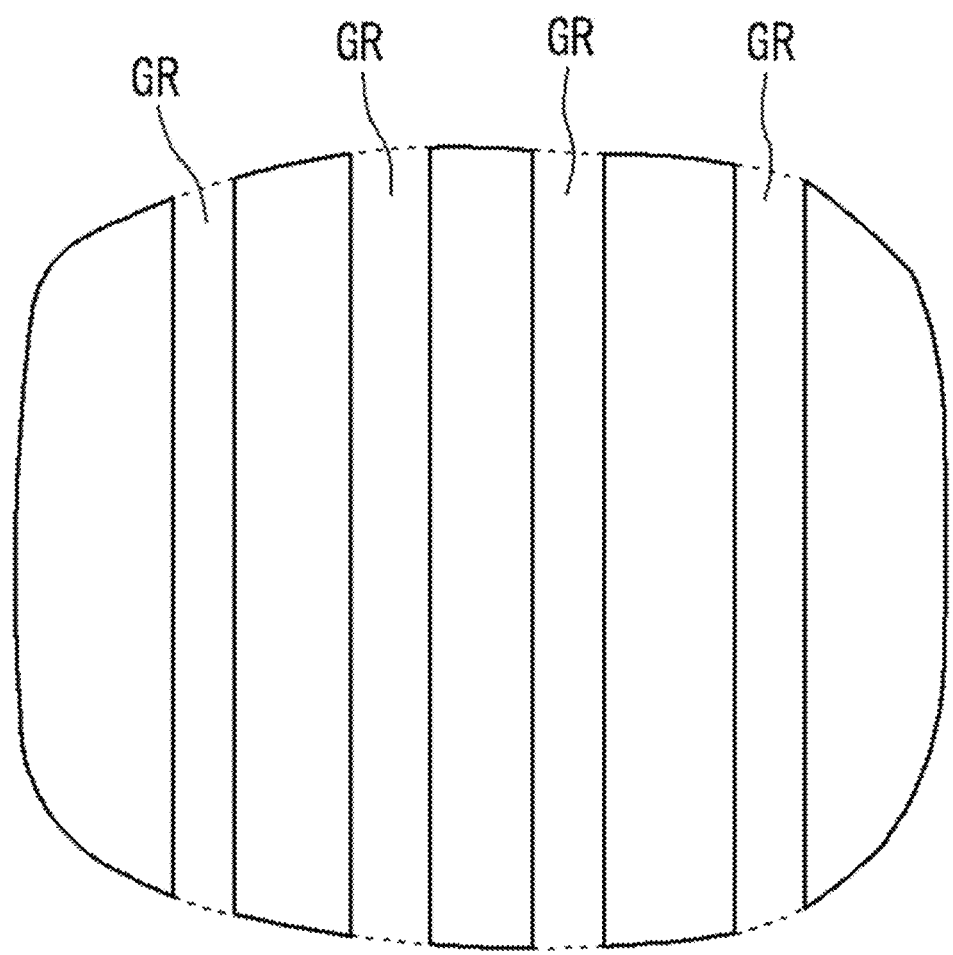
FIG. 4 schematically illustrates an example of a ground contact surface shape of a tire according to one or more embodiments of the present disclosure.

In the measurement of vertical deflection of the tire 2, a ground-contact-surface image as shown in FIG. 4 can be obtained. For the tire 2, based on the ground-contact-surface image, the ground contact area A100 in the case of a load represented by a load index being applied as a vertical load to the tire 2, and the ground contact area A73 in the case of a load that is 73% of a load represented by a load index being applied as a vertical load to the tire 2, can be obtained. The ground contact area can also include an area of a portion (for example, a portion corresponding to the circumferential groove 26p represented by reference character GR in FIG. 4) corresponding to the groove 26.

In the tire 2, in a case where the vertical deflection B100 and the ground contact area A100, and the vertical deflection B73 and the ground contact area A73 satisfy the above-described Equation (1), a ratio (B100/B73) of the vertical deflection B100 to the vertical deflection B73 can be not less than 1.38, from the viewpoint of sufficiently reducing rolling resistance. From the viewpoint of sufficiently enhancing braking performance, a ratio (A100/A73) of the ground contact area A100 to the ground contact area A73 can be not less than 1.34.

The tire 2 described above can be produced as follows. For producing the tire 2, components of the tire 2 such as the tread 4, the sidewalls 6, and the beads 10 can be assembled in a forming machine to prepare an unvulcanized tire 2 (hereinafter, also referred to as green tire), although the detailed description thereof is not given.

For producing the tire 2, the green tire can be put in a mold of a vulcanizer. The green tire can be pressurized and heated in the mold to obtain the tire 2. The tire 2 can be a vulcanized product of the green tire.

A method for producing the tire 2 can include preparing a green tire for the tire 2 and pressurizing and heating the green tire in a mold. For producing the tire 2, vulcanization conditions such as a temperature, a pressure, and a time are not particularly limited and standard vulcanization conditions can be adopted, although the detailed description thereof is not given.

Figure 5:
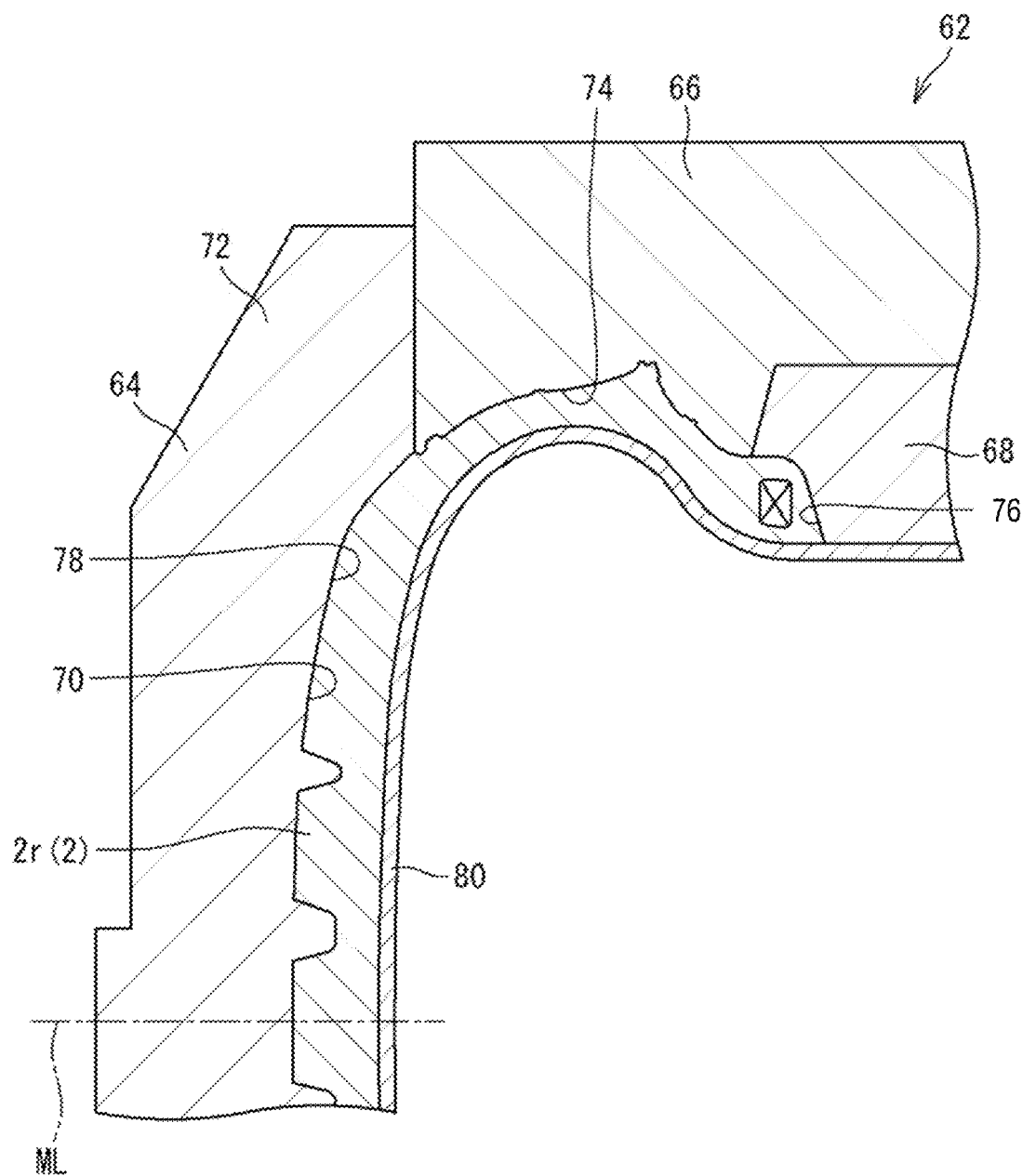
FIG. 5 is a cross-sectional view of a part of a tire mold according to one or more embodiments of the present disclosure.

FIG. 5 illustrates an example of a mold 62 used for producing the tire 2. FIG. 5 shows a part of a cross-section of the mold 62 along the plane including a center axis corresponding to the rotation axis of the tire 2. In FIG. 5, the up-down direction corresponds to the axial direction of the tire 2. The left-right direction corresponds to the radial direction of the tire 2. The direction perpendicular to the surface of the drawing sheet in FIG. 5 corresponds to the circumferential direction of the tire 2. For convenience of the description, the dimension for the mold 62 can be represented by the dimension for the tire 2. In FIG. 5, an alternate long and short dash line ML can represent the center line of the mold 62. The center line ML can correspond to the equator plane CL of the tire 2.

The mold 62 can include a tread ring 64, a pair of side plates 66, and a pair of bead rings 68. In FIG. 5, the mold 62 can be in a state where the tread ring 64, the pair of side plates 66, and the pair of bead rings 68 are assembled, that is, in a closed state. The mold 62 can be a segmented mold.

The tread ring 64 can form the outer portion of the mold 62 in the radial direction. The tread ring 64 can have a tread forming surface 70 at the inner surface. The tread forming surface 70 can shape the tread surface 24 of the tire 2. The tread ring 64 of the mold 62 can include multiple segments 72. The segments 72 can be arranged in a ring-like shape.

Each side plate 66 can be disposed inwardly of the tread ring 64 in the radial direction. The side plates 66 can be continuous with the ends of the tread ring 64. Each side plate 66 can have a sidewall forming surface 74 at the inner surface. The sidewall forming surface 74 can shape the side surface 34 of the tire 2.

Each bead ring 68 can be disposed inwardly of the side plate 66 in the radial direction. The bead rings 68 can be continuous with the ends of the side plates 66. Each bead ring 68 can have a bead forming surface 76 at the inner surface. The bead forming surface 76 can shape the bead 10 of the tire 2, specifically, a portion to be fitted onto the rim R.

In the mold 62, the multiple segments 72, the pair of side plates 66, and the pair of bead rings 68 can be assembled to form a cavity surface 78 for shaping the outer surface of the tire 2 on the outer surface of a green tire 2r. The mold 62 can include the cavity surface 78. The cavity surface 78 can be formed of the tread forming surface 70, the pair of the sidewall forming surfaces 74, and the pair of the bead forming surfaces 76.

In the pressurizing and heating, the green tire 2r can be pressed against the cavity surface 78 of the mold 62 by an expanded bladder 80. Thus, the outer surface of the tire 2 can be shaped on the outer surface of the green tire 2r. In the pressurizing and heating, a rigid core may be used instead of the expanded bladder 80.

Figure 6:
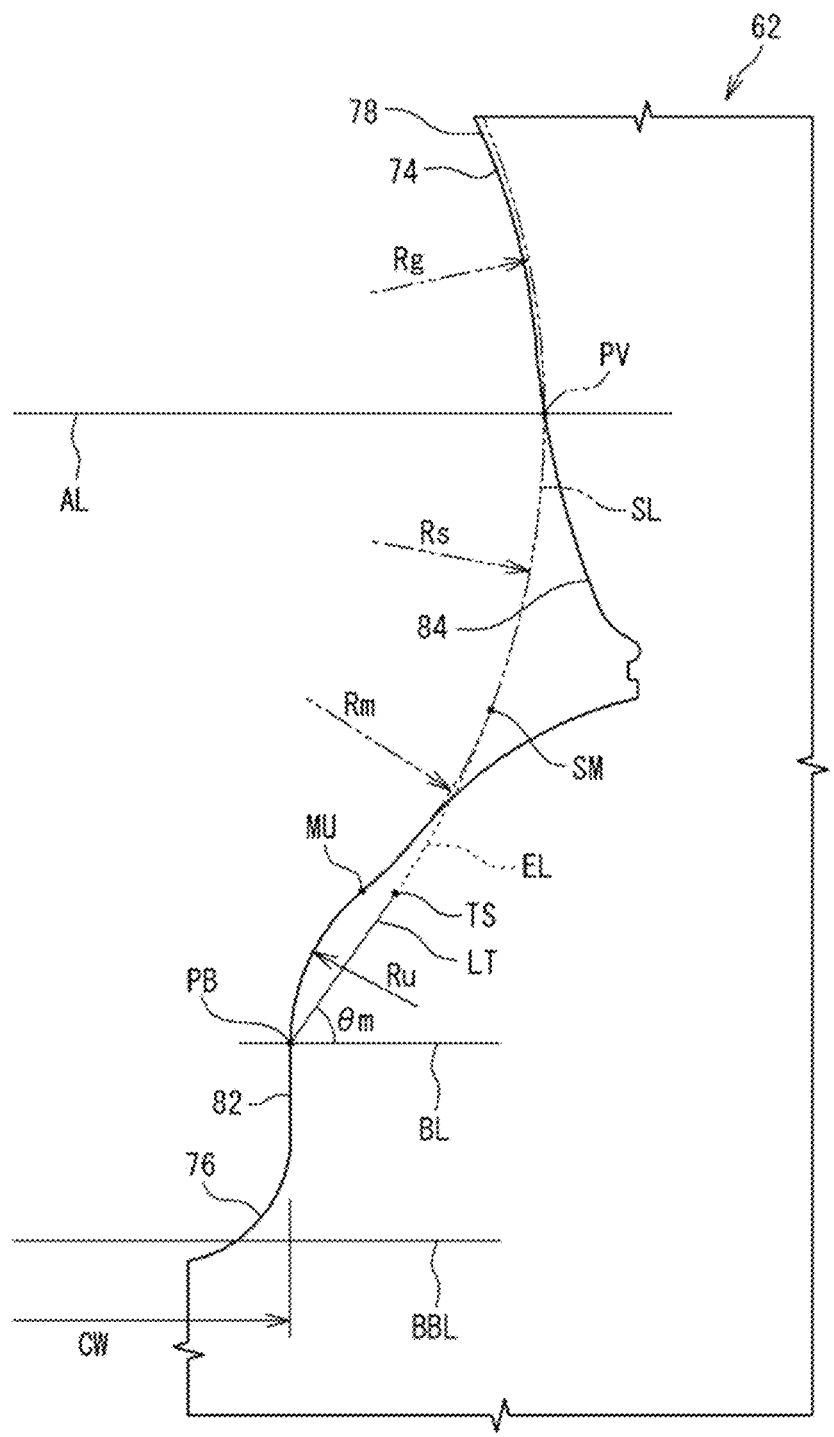
FIG. 6 is a cross-sectional view of a part of the mold shown in FIG. 5.

FIG. 6 shows a part of the mold 62 shown in FIG. 5. FIG. 6 shows parts of the sidewall forming surface 74 and the bead forming surface 76, that is, a part of the cavity surface 78. In FIG. 6, the up-down direction corresponds to the radial direction of the tire 2. The left-right direction corresponds to the axial direction of the tire 2. The direction perpendicular to the surface of the drawing sheet in FIG. 6 corresponds to the circumferential direction of the tire 2.

In FIG. 6, a single-headed arrow CW can represent a clip width of the mold 62. The cavity surface 78 can include reference surfaces 82 that define the clip width CW. The reference surface 82 can form a contact surface that can be in contact with a flange F of the rim R in the contact surface between the tire 2 and the rim R. On the contour of the cavity surface 78 shown FIG. 6, the reference surface 82 can be represented by a straight line extending in the radial direction. The clip width CW can be represented as a distance in the axial direction from one of the reference surfaces 82 to the other of the reference surfaces 82. In FIG. 6, reference character PB can represent the outer end of the reference surface 82.

In FIG. 6, reference character PV can represent a maximum width position of the cavity surface 78. As shown in FIG. 6, the cavity surface 78 can have a recess 84 for forming the rim protector 36. In FIG. 6, an alternate long and two short dashes line SL can represent an imaginary cavity surface obtained on the assumption that unevenness such as the recess 84 is absent. In the present disclosure, the imaginary cavity surface may also be referred to as a reference line of the cavity surface 78. In the mold 62, the maximum width position PV of the cavity surface 78 can be specified at the reference line SL.

In the mold 62, on the contour of the cavity surface 78, the maximum width position PV can be identified by three contour lines connecting between the maximum width position PV and the outer end PB of the reference surface 82. In other words, on the contour of the cavity surface 78, a portion between the maximum width position PV and the outer end PB of the reference surface 82 can be represented by the three contour lines. The reference line SL of the cavity surface 78 can include the three contour lines connecting between the maximum width position PV and the outer end PB of the reference surface 82. The three contour lines may each be represented as an arc.

In the mold 62, the three contour lines can be an outer contour line continuous with the maximum width position PV, an inner contour line continuous with the reference surface 82, and an intermediate contour line between the outer contour line and the inner contour line. In FIG. 6, reference character SM can represent a boundary between the outer contour line and the intermediate contour line. Reference character MU can represent a boundary between the intermediate contour line and the inner contour line.

In FIG. 6, an arrow Rs can represent a radius of the arc representing the outer contour line. The center of the circle that includes the arc representing the outer contour line can be disposed inwardly of the cavity surface 78 on a straight line (a solid line AL in FIG. 6) extending through the maximum width position PV in the axial direction.

An arrow Ru can represent a radius of the arc representing the inner contour line. The center of the circle that includes the arc representing the inner contour line can be disposed outwardly of the cavity surface 78 on a straight line (a solid line BL in FIG. 6) extending through the outer end PB of the reference surface 82 in the axial direction. A radius Ru of the arc representing the inner contour line can be set to be not less than 9 mm and/or not greater than 12 mm.

An arrow Rm can represent a radius of the arc representing the intermediate contour line. The center of the circle that includes the arc representing the intermediate contour line can be disposed inwardly of the cavity surface 78. The intermediate contour line can be in contact with the outer contour line at the boundary SM. The intermediate contour line can be in contact with the inner contour line at the boundary MU. The intermediate contour line can be in contact with each of the outer contour line and the inner contour line.

In FIG. 6, a solid line LT can represent an inclined line that extends through the outer end PB of the reference surface 82 so as to be inclined relative to the axial direction. The inclined line LT can be inclined relative to the axial direction such that a distance between the inclined line LT and the center line ML of the mold 62 is widened outwardly in the radial direction. In FIG. 6, an angle θm can represent an angle of the inclined line LT relative to the axial direction.

In FIG. 6, an arc represented by dashed lines EL can represent an extension line of the outer contour line. The arc EL can be an arc representing the outer contour line.

On the contour of the cavity surface 78, a portion between the boundary SM and the boundary MU can exert an influence on a degree of inclination of the apex 40 in the tire 2, specifically, on the apex angle θt.

In a conventional mold, the maximum width position PV and the boundary MU can be connected by one arc. Meanwhile, in the mold 62, the maximum width position PV and the boundary MU can be connected by two arcs including or consisting of the arc representing the outer contour line and the arc representing the intermediate contour line. In the mold 62, the portion, between the boundary SM and the boundary MU, which is formed so as to stand almost in the radial direction in a conventional mold, can be laid. By the mold 62, the apex angle θt can be set to be less than an apex angle set in a conventional mold. Furthermore, in the mold 62, the arc representing the outer contour line can be in contact with the inclined line LT at a position TS, and an angle θm of the inclined line LT relative to the axial direction may not be less than 50° and/or not greater than 60°.

With the mold 62, the tire 2 shown in FIG. 1 in which, in the normal state, a ratio (HA/HS) of the apex height HA to the tire cross-sectional height HS can be not greater than 30%, and the apex angle θt can be not greater than 55°, can be obtained. The tire 2 can allow increase of deflection while ensuring lateral stiffness as described above. By using the mold 62 and the production method using the mold 62, the tire 2 that allows enhancement of braking performance and reduction of rolling resistance while ensuring necessary steering stability can be obtained.

From the viewpoint that the mold 62 can contribute to production of the tire 2 that allows increase of deflection while ensuring lateral stiffness, the angle θm of the inclined line LT relative to the axial direction can be not less than 52°, for instance, not less than 54°. The angle θm can be not greater than 58°, for instance, not greater than 56°.

From the viewpoint that the mold 62 can contribute to production of the tire 2 that allows increase of deflection while ensuring lateral stiffness, the arc representing the intermediate contour line can have the radius Rm that is less than the radius Rs of the arc representing the outer contour line. Specifically, a ratio (Rm/Rs) of the radius Rm of the arc representing the intermediate contour line to the radius Rs of the arc representing the outer contour line can be not less than 0.48, for instance, not less than 0.50. The ratio (Rm/Rs) can be not greater than 0.76, for instance, not greater than 0.74.

In the mold 62, the reference line of the cavity surface 78 can include an upper contour line continuous with the outer contour line at the maximum width position PV. In FIG. 6, an arrow Rg can represent a radius of an arc representing the upper contour line. The center of the circle that includes the arc representing the upper contour line can be disposed inwardly of the cavity surface 78 on the straight line AL extending through the maximum width position PV in the axial direction, which is not shown. The upper contour line can be in contact with the outer contour line at the maximum width position PV.

From the viewpoint that the mold 62 can contribute to production of the tire 2 that allows deflection to be increased and allows the ground contact area to be ensured while ensuring lateral stiffness, the arc representing the upper contour line can have the radius Rg that can be less than the radius Rs of the arc representing the outer contour line. Specifically, a ratio (Rg/Rs) of the radius Rg of the arc representing the upper contour line to the radius Rs of the arc representing the outer contour line can be not less than 0.85, for instance, not less than 0.88. The ratio (Rg/Rs) can be not greater than 0.97, for instance, not greater than 0.94.

As described above, according to the present disclosure, the tire 2 that allows enhancement of braking performance and reduction of rolling resistance while ensuring necessary steering stability, the mold 62 for obtaining the tire 2, and the production method can be obtained. According to the present disclosure, the effect can be exhibited in the tire 2 having a speed range of not less than W, where W is 270 km/h (168 mph). For instance, the speed range can be W to Y, 270 km/h (168 mph) to 300 km/h (186 mph), respectively, from a speed rating chart.

EXAMPLES

The present disclosure will be described below in more detail by means of examples and the like. However, the present disclosure is not limited to the examples only.

Example 1

A pneumatic tire (tire size=225/45R19 92W), for a passenger car, having the basic structure shown in FIG. 1 and the specifications indicated below in Table 1 was obtained.

In Example 1, the apex angle θt was set to 55°. The ratio (HA/HS) of the distance HA in the radial direction from the bead base line to the outer end PA of the apex, relative to the tire cross-sectional height HS, was set to 25%. The thickness E of the sidewall at the tire maximum width position PW was set to 4.0 mm.

In Example 1, a vertical deflection ratio represented by a ratio (B100/B73) of the vertical deflection B100 obtained when a load represented by a load index was applied as a vertical load, relative to the vertical deflection B73 obtained when a load that was 73% of a load represented by a load index was applied as a vertical load, was 1.38. A ground contact area ratio represented by a ratio (A100/A73) of the ground contact area A100 obtained when a load represented by a load index was applied as a vertical load, relative to the ground contact area A73 obtained when a load that was 73% of a load represented by a load index was applied as a vertical load, was 1.34. A coefficient α represented by a ratio of the vertical deflection ratio (B100/B73) to the ground contact area ratio (A100/A73) was 1.03.

For measuring the vertical deflection and the ground contact area, the tire was mounted on a rim (size=19×7.5) and was filled with air to adjust the internal pressure of the tire to 240 kPa.

Comparative Examples 1 and 2

Tires of Comparative examples 1 and 2 were each obtained in the same manner as in Example 1 except that the apex angle θt was as indicated below in Table 1. The vertical deflection ratio, the ground contact area ratio, and the coefficient α in each of Comparative examples 1 and 2 were as indicated in Table 1.

Examples 2 and 3

Tires of Examples 2 and 3 were each obtained in the same manner as in Example 1 except that the thickness E was as indicated below in Table 1. The vertical deflection ratio, the ground contact area ratio, and the coefficient α in each of Examples 2 and 3 were as indicated in Table 1.

Example 4

A tire of Example 4 was obtained in the same manner as in Example 1 except that the angle θt and the ratio (HA/HS) were as indicated below in Table 2. The vertical deflection ratio, the ground contact area ratio, and the coefficient α in Example 4 were as indicated in Table 2.

Example 5 and Comparative Example 3

Tires of Example 5 and Comparative example 3 were each obtained in the same manner as in Example 1 except that the ratio (HA/HS) was as indicated below in Table 2. The vertical deflection ratio, the ground contact area ratio, and the coefficient α in each of Example 5 and Comparative example 3 were as indicated in Table 2.
[Braking Performance]

The sample tire was mounted on a rim (size=19×7.5) and was filled with air to adjust an internal pressure of the tire to 240 kPa. The tires were mounted to a test vehicle (passenger car), and the test vehicle was caused to run on a test course for evaluating braking performance. A braking distance from a speed of 64 km/h was measured. The results were indicated below as indexes in Tables 1 and 2. The greater the value is, the higher frictional force of the tire against a dry road surface is and the more excellent braking performance is.
[Rolling Resistance Coefficient (RRC)]

A rolling resistance testing machine was used to measure a rolling resistance coefficient (RRC) by performing running with the sample tire on a drum at a speed of 80 km/h under the following conditions. The results are indicated below as indexes in Tables 1 and 2. The greater the value is, the lower the rolling resistance of the tire is.

Rim: 19×7.5
Internal pressure: 240 kPa
Vertical load: 4.75 kN
[Steering Stability]

The sample tire was mounted on a rim (size=19×7.5) and was filled with air to adjust an internal pressure of the tire to 240 kPa. The tires were mounted to a test vehicle (passenger car), and the test vehicle was caused to run on a dry asphalt road surface in a test course. A driver made an evaluation (sensory evaluation) of steering stability. The results are indicated below as indexes in Tables 1 and 2. The greater the value is, the more excellent steering stability of the tire is. In this evaluation, an index of not less than 95 is required as an allowable index for ensuring necessary steering stability.

TABLE 1

| | Comparative example 1 | Example 2 | Example 1 | Example 3 | Comparative example 2 |
|---|---|---|---|---|---|
| θt [°] | 60 | 55 | 55 | 55 | 40 |
| HA/HS [%] | 25 | 25 | 25 | 25 | 25 |
| E [mm] | 4.0 | 3.5 | 4.0 | 4.5 | 4.0 |
| B100/B73 | 1.30 | 1.39 | 1.38 | 1.37 | 1.41 |
| A100/A73 | 1.30 | 1.35 | 1.34 | 1.34 | 1.37 |
| α [—] | 1.00 | 1.03 | 1.03 | 1.02 | 1.03 |
| Braking performance | 100 | 109 | 108 | 107 | 115 |
| RRC | 100 | 110 | 108 | 106 | 109 |
| Steering stability | 100 | 99 | 100 | 101 | 93 |

TABLE 2

| | Example 4 | Example 5 | Comparative example 3 |
|---|---|---|---|
| θt [°] | 45 | 55 | 55 |
| HA/HS [%] | 20 | 30 | 35 |
| E [mm] | 4.0 | 4.0 | 4.0 |
| B100/B73 | 1.40 | 1.38 | 1.34 |
| A100/A73 | 1.36 | 1.34 | 1.32 |
| α [—] | 1.03 | 1.03 | 1.02 |
| Braking performance | 111 | 108 | 102 |
| RRC | 110 | 108 | 101 |
| Steering stability | 96 | 100 | 104 |

As indicated in Tables 1 and 2, in the examples, braking performance was enhanced and rolling resistance was reduced while necessary steering stability was ensured. The evaluation results clearly indicate that the technique of the present disclosure is superior to at least the comparative examples.

The above-described technique for allowing enhancement of braking performance and reduction of rolling resistance while necessary steering stability is ensured can be applicable to various tires.

In the tire, the carcass can include a first carcass ply and a second carcass ply. The first carcass ply can include a first ply body extending on and between one of the cores and another of the cores, and a pair of first turned-up portions that are continuous with the first ply body and are turned up around the cores from an inner side toward an outer side in the axial direction. An end of each first turned-up portion can be disposed outwardly of a tire maximum width position in the radial direction. The second carcass ply can include a second ply body extending on and between one of the cores and another of the cores, and a pair of second turned-up portions that are continuous with the second ply body and are turned up around the cores from the inner side toward the outer side in the axial direction. An end of each second turned-up portion can be disposed between the outer end of a corresponding one of the apexes and the contact surface of the apex at which the apex is in contact with a corresponding one of the cores, in the radial direction.

In the tire, a thickness of each sidewall at a tire maximum width position can be not greater than 4.0 mm.

In the tire, a vertical deflection B100 and a ground contact area A100, and a vertical deflection B73 and a ground contact area A73 can satisfy the following Equation (1) where B100 and A100 represent the vertical deflection and the ground contact area, respectively, obtained when a load represented by a load index is applied as a vertical load to the tire in the normal state, and B73 and A73 represent the vertical deflection and the ground contact area, respectively, obtained when a load that is 73% of the load represented by the load index is applied as a vertical load to the tire in the normal state.

$$1.03 \leq (B100/B73)/(A100/A73) \leq 1.06 \quad \text{Equation (1)}$$

In the tire mold, a ratio of a radius of the arc representing the intermediate contour line to a radius of the arc representing the outer contour line may not be less than 0.48 and/or may not be greater than 0.75.

According to the present disclosure, the tire that allows enhancement of braking performance and reduction of rolling resistance while ensuring necessary steering stability can be obtained.

What is claimed is:

1. A tire having a speed range from W to Y in a speed rating chart, where W is 270 km/h and Y is 300 km/h, the tire comprising:
    a tread configured to come into contact with a road surface;
    a pair of sidewalls continuous with ends of the tread, the pair of sidewalls disposed inwardly of the tread in a radial direction;
    a pair of beads disposed inwardly of the sidewalls in the radial direction; and a carcass extending on and between one of the beads and another of the beads in portions inward of the tread and the pair of sidewalls, wherein the beads include cores and apexes disposed outwardly of the cores in the radial direction, and wherein, in a normal state in which the tire is mounted on a normal rim, an internal pressure is adjusted to a normal internal pressure, and no load is applied:

a ratio of a distance in the radial direction from a bead base line to an outer end of each said apex, to a tire cross-sectional height, is not less than 20% and not greater than 30%, and an angle of a line segment connecting between the outer end of each said apex and a center of a width, in an axial direction, of a contact surface of the apex at which the apex is in contact with a corresponding one of the cores, relative to the bead base line, is not less than 45° and not greater than 55°, wherein a vertical deflection B100 and a ground contact area A100, and a vertical deflection B73 and a ground contact area A73 satisfy the following Equation (1), where B100 and A100 represent the vertical deflection and the ground contact area, respectively, obtained when a first load represented by a load index is applied as a vertical load to the tire in the normal state, and B73 and A73 represent the vertical deflection and the ground contact area, respectively, obtained when a second load that is 73% of the load represented by the load index is applied as a vertical load to the tire in the normal state:

$$1.03 \leq (B100/B73)/(A100/A73) \leq 1.06. \quad \text{Equation (1)}$$

2. The tire according to claim 1,
wherein the carcass includes a first carcass ply and a second carcass ply,
wherein the first carcass ply has a first ply body extending on and between one of the cores and another of the cores, and a pair of first turned-up portions that are continuous with the first ply body and are turned up around the cores from an inner side toward an outer side in the axial direction,
wherein an end of each first turned-up portion is disposed outwardly of a tire maximum width position in the radial direction,
wherein the second carcass ply has a second ply body extending on and between one of the cores and another of the cores, and a pair of second turned-up portions that are continuous with the second ply body and are turned up around the cores from the inner side toward the outer side in the axial direction, and
wherein an end of each said second turned-up portion is disposed between the outer end of a corresponding one of the apexes and the contact surface of the apex at which the apex is in contact with a corresponding one of the cores, in the radial direction.

3. The tire according to claim 1, wherein a thickness of each said sidewall at a tire maximum width position is not greater than 4.0 mm.

4. The tire according to claim 2, wherein a thickness of each said sidewall at a tire maximum width position is not greater than 4.0 mm.

* * * * *